US012738659B2

(12) United States Patent
Chen et al.

(10) Patent No.: US 12,738,659 B2
(45) Date of Patent: Sep. 15, 2026

(54) ANTENNA STRUCTURE

(71) Applicant: Wistron NeWeb Corp., Hsinchu (TW)

(72) Inventors: Chun-Kai Chen, Hsinchu (TW); Wen-Pin Ho, Hsinchu (TW); Ching-Wen Chen, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 17 days.

(21) Appl. No.: 19/173,958

(22) Filed: Apr. 9, 2025

(65) Prior Publication Data

US 2026/0149186 A1 May 28, 2026

(30) Foreign Application Priority Data

Nov. 26, 2024 (TW) ................................ 113145524

(51) Int. Cl.
*H01Q 1/48* (2006.01)
*H01Q 13/16* (2006.01)

(52) U.S. Cl.
CPC ............... *H01Q 13/16* (2013.01); *H01Q 1/48* (2013.01)

(58) Field of Classification Search
CPC ............ H01Q 1/48; H01Q 1/38; H01Q 5/371; H01Q 9/42; H01Q 1/2266; H01Q 13/16
See application file for complete search history.

(56) References Cited

U.S. PATENT DOCUMENTS

2020/0091595 A1* 3/2020 Lee .......................... H01Q 1/22
2021/0167499 A1* 6/2021 Tseng ..................... H01Q 5/385
2023/0198149 A1* 6/2023 Wei .......................... H01Q 1/22
343/702

FOREIGN PATENT DOCUMENTS

TW 202021188 A 6/2020
TW 202327166 A 7/2023

* cited by examiner

*Primary Examiner* — David E Lotter
(74) *Attorney, Agent, or Firm* — McClure, Qualey & Rodack, LLP

(57) ABSTRACT

An antenna structure includes a ground element, a first radiation element, a second radiation element, a third radiation element, a nonconductive support element, and a metal mechanism element. The first radiation element has a feeding point. The second radiation element is coupled to a first grounding point on the ground element and adjacent to the first radiation element. The third radiation element is coupled to a second grounding point on the ground element. The third radiation element is adjacent to the first radiation element. The first radiation element is between the second radiation element and the third radiation element. The ground element, the first radiation element, the second radiation element, and the third radiation element are disposed on the nonconductive support element. The metal mechanism element has a slot.

20 Claims, 6 Drawing Sheets

ANTENNA STRUCTURE

CROSS-REFERENCE TO RELATED PATENT APPLICATION

This application claims the benefit of priority to Taiwan Patent Application No. 113145524, filed on Nov. 26, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an antenna structure, in particular to a wideband antenna structure.

BACKGROUND OF THE DISCLOSURE

With the development of mobile communication technology, mobile devices have become increasingly popular in recent years. Common examples include laptop computers, mobile phones, multimedia players, and other portable electronic devices with hybrid functions. To meet users'needs, mobile devices are generally equipped with wireless communication capabilities. Some systems cover long-range wireless communication, such as mobile phones using 2G, 3G, and LTE (Long Term Evolution) systems, which operate on frequency bands of 700 MHz, 850 MHz, 900 MHz, 1800 MHz, 1900 MHz, 2100 MHz, 2300 MHz, and 2500 MHz. Some systems cover short-range wireless communication, such as Wi-Fi and Bluetooth, which operate on the 2.4 GHz, 5.2 GHz, and 5.8 GHz frequency bands.

Antennas are indispensable components in the field of wireless communication. If an antenna used for receiving or transmitting signals has insufficient bandwidth, it can easily lead to a degradation in the communication quality of mobile devices. Therefore, designing compact, wideband antenna elements is an important challenge for antenna designers.

SUMMARY OF THE DISCLOSURE

In a preferred embodiment, the present disclosure provides an antenna structure, including: a ground element; a first radiation element having a feeding point; a second radiation element coupled to a first grounding point on the ground element, wherein the second radiation element is adjacent to the first radiation element; a third radiation element coupled to a second grounding point on the ground element, wherein the third radiation element is adjacent to the first radiation element, and the first radiation element is between the second radiation element and the third radiation element; a nonconductive support element, wherein the ground element, the first radiation element, the second radiation element, and the third radiation element are all disposed on the nonconductive support element; and a metal mechanism element having a slot, wherein the metal mechanism element is adjacent to the first radiation element, the second radiation element, and the third radiation element.

In some embodiments, the first radiation element is in an L-shape with a variable width.

In some embodiments, the first radiation element includes a wide portion and a narrow portion, wherein the narrow portion is coupled to the feeding point through the wide portion.

In some embodiments, the second radiation element is in an L-shape with a uniform width.

In some embodiments, a first coupling gap is formed between the first radiation element and the second radiation element, and the width of the first coupling gap is between 0.1 mm and 3 mm.

In some embodiments, the third radiation element includes a sloping portion and an extension portion, and the extension portion is coupled to the second grounding point through the sloping portion.

In some embodiments, an angle is formed between the ground element and the sloping portion of the third radiation element, wherein the angle is between 10 degrees and 80 degrees.

In some embodiments, a second coupling gap is formed between the first radiation element and the third radiation element, wherein the width of the second coupling gap is between 0.1 mm and 3 mm.

In some embodiments, the slot of the metal mechanism element is a closed slot.

In some embodiments, the slot of the metal mechanism element has a C-shape.

In some embodiments, the slot of the metal mechanism element has an H-shape.

In some embodiments, the first radiation element has a first vertical projection on the metal mechanism element, and the second radiation element has a second vertical projection on the metal mechanism element, wherein both the first vertical projection and the second vertical projection at least partially overlap with the slot of the metal mechanism element.

In some embodiments, a predetermined distance is between the metal mechanism element and each of the first radiation element, the second radiation element, and the third radiation element, wherein the predetermined distance is between 1 mm and 10 mm.

In some embodiments, the antenna structure covers a first frequency band, a second frequency band, a third frequency band, and a fourth frequency band.

In some embodiments, the first frequency band is between 1400 MHz and 1500 MHz, the second frequency band is between 1800 MHz and 2690 MHz, the third frequency band is between 3300 MHz and 5000 MHz, and the fourth frequency band is between 5000 MHz and 5925 MHz.

In some embodiments, the length of the first radiation element is between 0.125 times and 0.25 times the wavelength of the second frequency band.

In some embodiments, the length of the second radiation element is between 0.125 times and 0.25 times the wavelength of the first frequency band.

In some embodiments, the length of the third radiation element is between 0.0625 times and 0.125 times the wavelength of the third frequency band.

In some embodiments, the length of the slot of the metal mechanism element is between 0.25 times and 0.75 times the wavelength of the first frequency band.

In some embodiments, the antenna structure is applied to a notebook computer, and the metal mechanism element is implemented with the base housing of the notebook computer.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
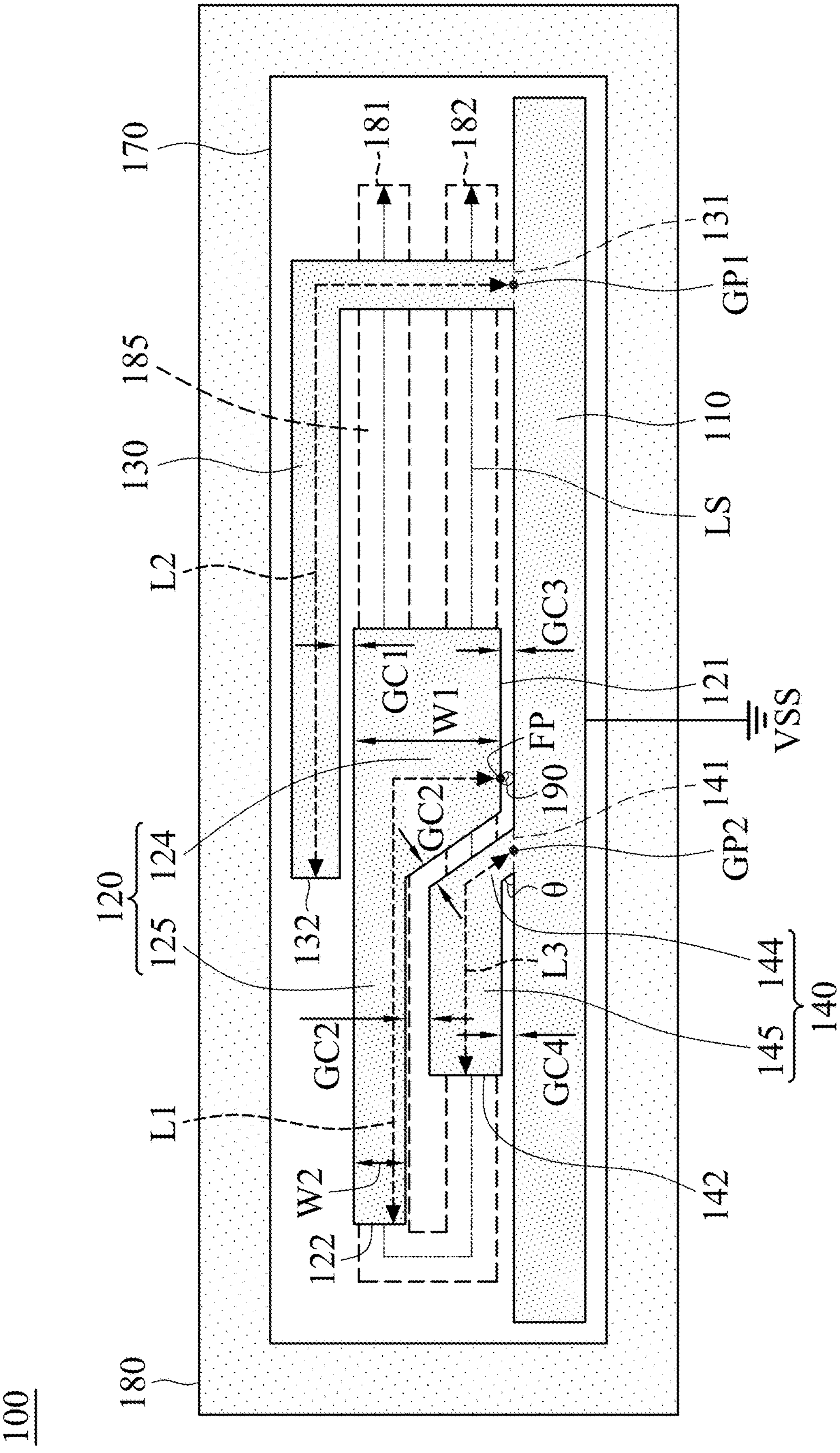
FIG. 1 is a top view of an antenna structure according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

The term "approximate" or "roughly" refers to the acceptable range of error within which a person having ordinary skill in the art can address the technical issues and achieve the fundamental technical effect. Furthermore, the term "couple" in the present disclosure includes any direct and indirect means of electrical connection. Therefore, if the disclosure describes a first device coupled to a second device, it means that the first device can be directly electrically connected to the second device or indirectly electrically connected to the second device through other devices or connection means.

Figure 2:
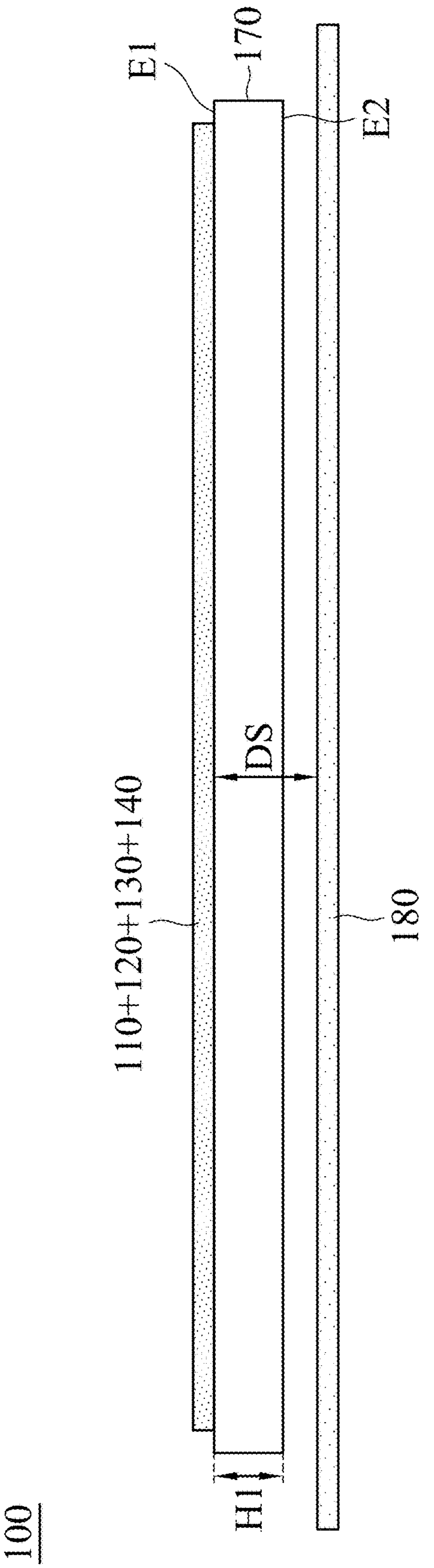
FIG. 2 is a side view of an antenna structure according to an embodiment of the present disclosure.

FIG. 1 is a top view of the antenna structure 100 according to an embodiment of the present disclosure. FIG. 2 is a side view of the antenna structure 100 according to an embodiment of the present disclosure. Please refer to FIGS. 1 and 2 together. The antenna structure 100 can be applied to a mobile device, such as a smartphone, a tablet computer, or a notebook computer. As shown in FIGS. 1 and 2, the antenna structure 100 includes a ground element 110, a first radiation element 120, a second radiation element 130, a third radiation element 140, a nonconductive support element 170, and a metal mechanism element 180. The ground element 110, the first radiation element 120, the second radiation element 130, and the third radiation element 140 can be made of metallic materials such as copper, silver, aluminum, iron, or their alloys.

The ground element 110 may be implemented using a ground copper foil. In some embodiments, the ground element 110 may further be coupled to a ground voltage (VSS), which may be provided by a system ground plane of the antenna structure 100 (not shown).

For example, the first radiation element 120 may generally be in an L-shape with a variable width, but is not limited thereto. Specifically, the first radiation element 120 has a first end 121 and a second end 122 in which a feeding point (FP) is located at the first end 121 of the first radiation element 120. The feeding point FP may further be coupled to a positive electrode of a signal source 190, while a negative electrode of the signal source 190 may be coupled to the ground element 110. For example, the signal source 190 may be a radio frequency (RF) module, which can be used to excite the antenna structure 100. In some embodiments, the first radiation element 120 includes a wide portion 124 near the first end 121 and a narrow portion 125 near the second end 122 in which the narrow portion 125 is coupled to the feeding point FP through the wide portion 124. It should be noted that the terms "adjacent" or "neighboring" in this specification may refer to a distance between two corresponding components being less than a predetermined value (e.g., 15 mm or shorter), and may also include cases where the two corresponding components are in direct contact with each other (i.e., the distance is reduced to 0).

For example, the second radiation element 130 may generally be in an L-shape with a uniform width, but is not limited thereto. Specifically, the second radiation element 130 has a first end 131 and a second end 132 in which the first end 131 of the second radiation element 130 is coupled to a first grounding point GP1 on the ground element 110, and the second end 132 of the second radiation element 130 is an open end. In some embodiments, the second radiation element 130 is adjacent to the first radiation element 120 in which a first coupling gap GC1 may be formed between the first radiation element 120 and the second radiation element 130.

It should be noted that the first radiation element 120 is located between the second radiation element 130 and the third radiation element 140. Specifically, the third radiation element 140 has a first end 141 and a second end 142 in which the first end 141 of the third radiation element 140 is coupled to a second grounding point GP2 on the ground element 110, and the second end 142 of the third radiation element 140 is an open end. The second grounding point GP2 may be different from the aforementioned first grounding point GP1. For example, the second end 122 of the first radiation element 120, the second end 132 of the second radiation element 130, and the second end 142 of the third radiation element 140 may all extend in substantially the same direction. In some embodiments, the third radiation element 140 includes a sloping portion 144 near the first end 141 and an extension portion 145 near the second end 142 in which the extension portion 145 is coupled to the second grounding point GP2 through the sloping portion 144. For example, an angle θ may be formed between the ground element 110 and the sloping portion 144 of the third radiation element 140. In some embodiments, the third radiation element 140 is adjacent to the first radiation element 120 in which a second coupling gap GC2 may be formed between the first radiation element 120 and the third radiation element 140.

In some embodiments, the first radiation element 120 is also adjacent to the ground element 110 in which a third coupling gap GC3 may be formed between the ground element 110 and the wide portion 124 of the first radiation element 120. Additionally, the third radiation element 140 is also adjacent to the ground element 110 in which a fourth coupling gap GC4 may be formed between the ground element 110 and the extension portion 145 of the third radiation element 140.

The nonconductive support element may be made of a plastic material, and its shape and configuration are not particularly limited in the present disclosure. The nonconductive support element 170 has a first surface E1 and a second surface E2 in which the ground element 110, the first radiation element 120, the second radiation element 130, and the third radiation element 140 are all disposed on the first surface E1 of the nonconductive support element 170. In some embodiments, the nonconductive support element 170 may also be implemented using a printed circuit board (PCB) or a flexible printed circuit (FPC).

The second surface E2 of the nonconductive support element 170 may face the metal mechanism element 180. In some embodiments, the metal mechanism element 180 may also be disposed on the second surface E2 of the nonconductive support element 170, but is not limited thereto. The metal mechanism element 180 has a slot 185. For example, the slot 185 of the metal mechanism element 180 may be a closed slot, which may generally be in a C-shape. Specifically, the slot 185 of the metal mechanism element 180 has a first closed end 181 and a second closed end 182, which may be positioned adjacent to each other and extend substantially in the same direction. Additionally, the metal mechanism element 180 is adjacent to the first radiation element 120, the second radiation element 130, and the third radiation element 140 in which a predetermined distance DS is maintained between the metal mechanism element 180 and each of the first radiation element 120, the second radiation element 130, and the third radiation element 140. In some embodiments, the first radiation element 120 has a first vertical projection on the metal mechanism element 180, and the second radiation element 130 has a second vertical projection on the metal mechanism element 180 in which both the first vertical projection and the second vertical projection at least partially overlap with the slot 185 of the metal mechanism element 180. In other embodiments, the third radiation element 140 has a third vertical projection on the metal mechanism element 180 in which the third vertical projection also at least partially overlaps with the slot 185 of the metal mechanism element 180.

Figure 3:
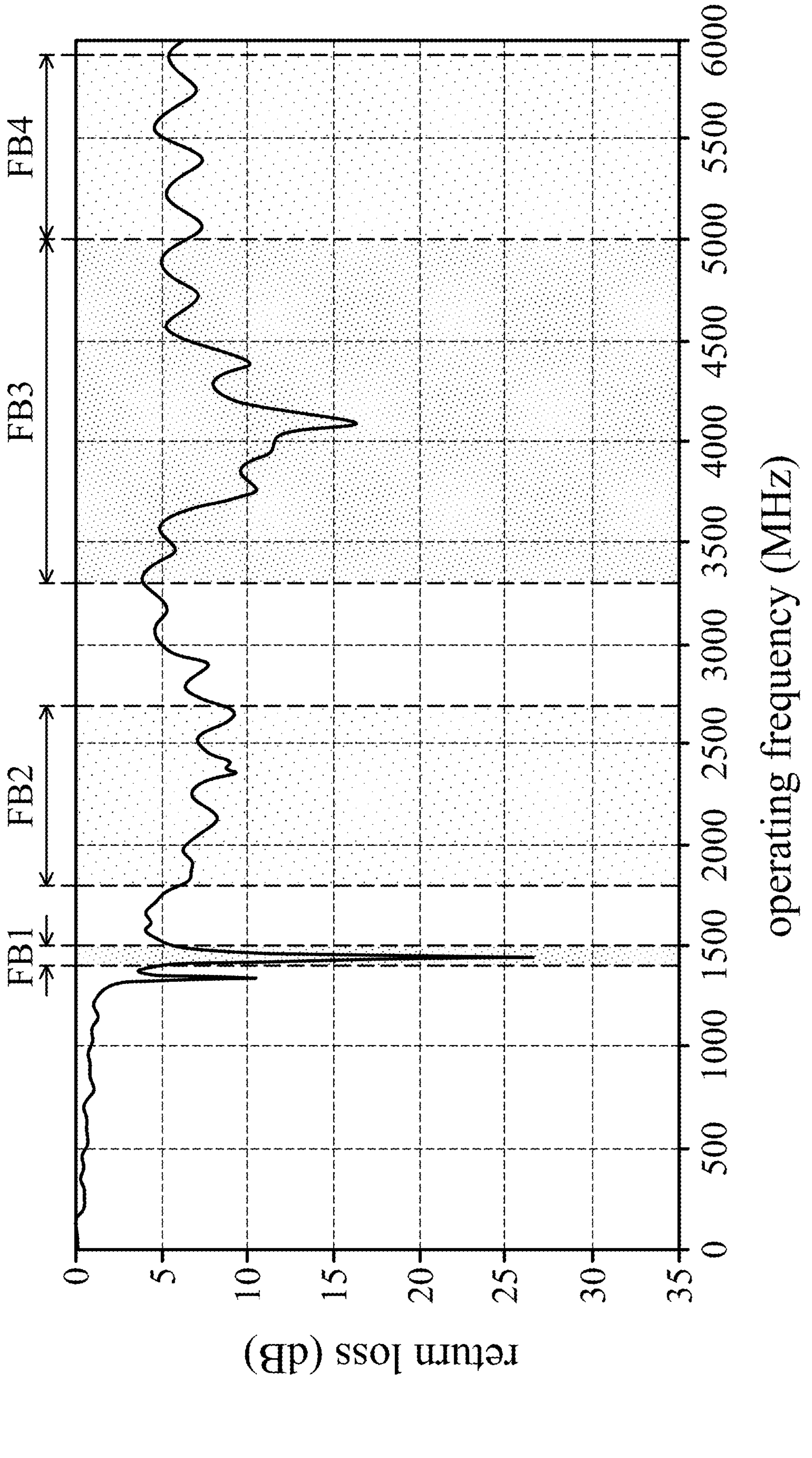
FIG. 3 is a diagram of return loss of an antenna structure according to an embodiment of the present disclosure.

FIG. 3 is a diagram of the return loss of the antenna structure 100 according to an embodiment of the present disclosure, where the horizontal axis represents the operating frequency (MHz), and the vertical axis represents the return loss (dB). According to the measurement results in FIG. 3, the antenna structure 100 can cover a first frequency band FB1, a second frequency band FB2, a third frequency band FB3, and a fourth frequency band FB4. For example, the first frequency band FB1 may be between 1400 MHz and 1500 MHz, the second frequency band FB2 may be between 1800 MHz and 2690 MHz, the third frequency band FB3 may be between 3300 MHz and 5000 MHz, and the fourth frequency band FB4 may be between 5000 MHz and 5925 MHz. Therefore, the antenna structure 100 can at least support broadband operation for LTE (Long Term Evolution) and WLAN (Wireless Local Area Network).

In some embodiments, the operating principle of the antenna structure 100 can be described as follows. The first radiation element 120 can excite a fundamental resonant mode, forming the aforementioned second frequency band FB2. The second radiation element 130 can be excited by coupling with the first radiation element 120, forming the aforementioned first frequency band FB1. The third radiation element 140 can also be excited by coupling with the first radiation element 120, forming the aforementioned third frequency band FB3. The first radiation element 120 can further excite a higher-order resonant mode, forming the aforementioned fourth frequency band FB4. Additionally, a coupling effect may be induced between the first radiation element 120 and the metal mechanism element 180. According to actual measurement results, the metal mechanism element 180 and its slot 185 help increase the bandwidth of the first frequency band FB1, while the varying width design of the first radiation element 120 can be used to fine-tune the impedance matching of the fourth frequency band FB4. In other embodiments, even if the pattern of the antenna structure 100 is mirrored (i.e., reversed left to right or flipped upside down), its normal radiation performance remains unaffected.

Figure 4:
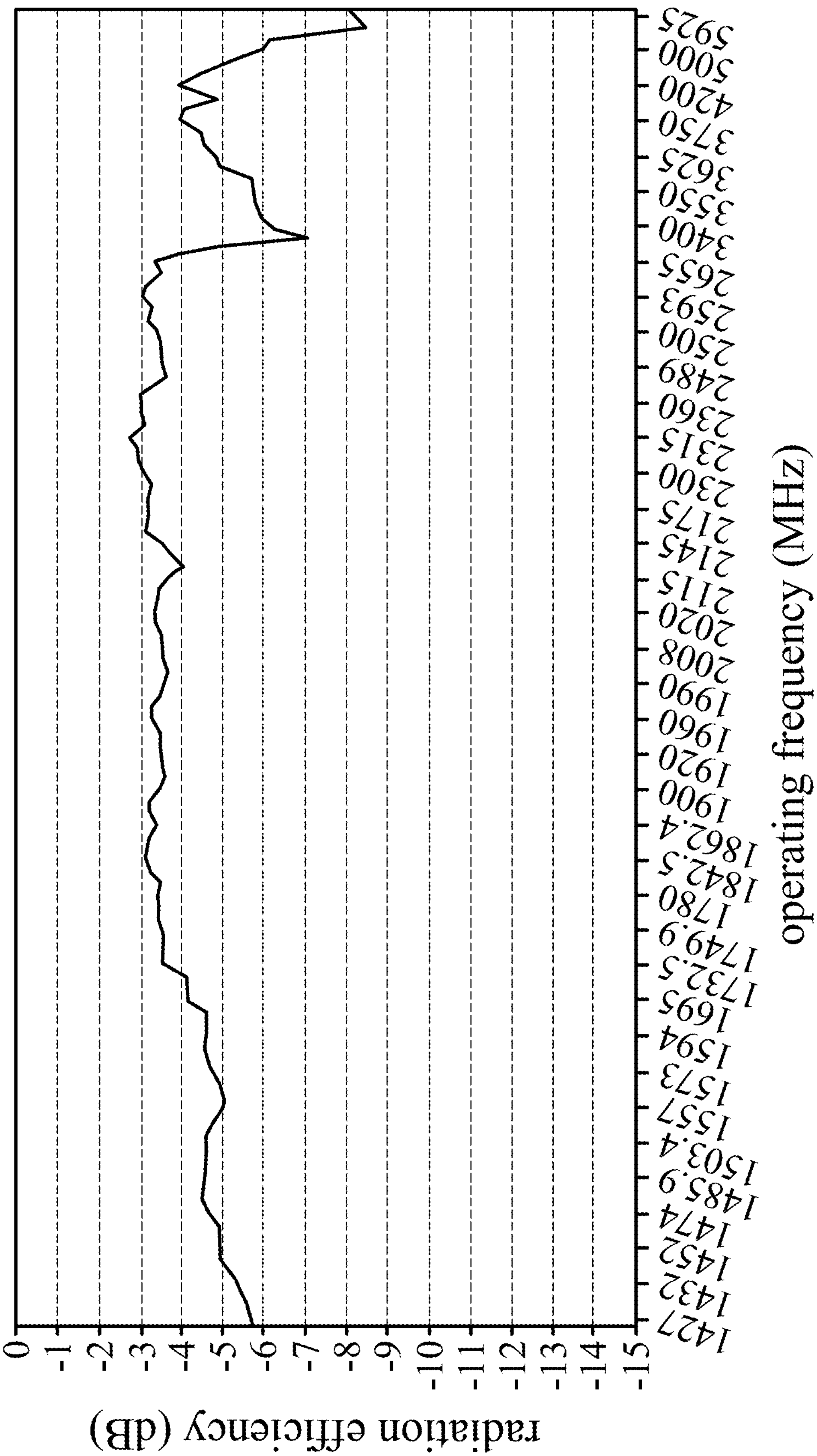
FIG. 4 is a diagram of radiation efficiency of an antenna structure according to an embodiment of the present disclosure.

FIG. 4 is a diagram of the radiation efficiency of the antenna structure 100 according to an embodiment of the present disclosure, where the horizontal axis represents the operating frequency (MHz), and the vertical axis represents the radiation efficiency (dB). According to the measurement results in FIG. 4, the radiation efficiency of the antenna structure 100 within the aforementioned first frequency band FB1, second frequency band FB2, third frequency band FB3, and fourth frequency band FB4 can all reach above −9 dB, which is sufficient to meet the practical application requirements of general mobile communication devices.

In some embodiments, the dimensions of the components of the antenna structure 100 are as follows. The length L1 of the first radiation element 120 may be between 0.125 times and 0.25 times the wavelength of the second frequency band FB2 (λ/8 to λ/4). In the first radiation element 120, the width W1 of the wide portion 124 may be between 4 mm and 7 mm, while the width W2 of the narrow portion 125 may be between 0.5 mm and 2 mm. The length L2 of the second radiation element 130 may be between 0.125 times and 0.25 times the wavelength of the first frequency band FB1 (λ/8 to λ/4). The length L3 of the third radiation element 140 may be between 0.0625 times and 0.125 times the wavelength of the third frequency band FB3 (λ/16 to λ/8). The length LS of the slot 185 of the metal mechanism element 180 may be between 0.25 times and 0.75 times the wavelength of the first frequency band FB1 (λ/4 to 3λ/4), for example, approximately 0.5 times the wavelength (λ/2). The width of the first coupling gap GC1 may be between 0.1 mm and 3 mm. The width of the second coupling gap GC2 may be between 0.1 mm and 3 mm. The width of the third coupling gap GC3 may be between 0.1 mm and 2 mm. The width of the fourth coupling gap GC4 may be between 0.1 mm and 2 mm. The thickness H1 of the nonconductive support element 170 may be between 5 mm and 6 mm. The predetermined distance DS may be between 1 mm and 10 mm, or between 7 mm and 14 mm. The angle θ may be between 10 degrees and 80 degrees, for example, approximately 30 degrees, approximately 40 degrees, or approximately 50 degrees. The above dimension ranges are derived from multiple experimental results and contribute to optimizing the operational bandwidth, impedance matching, and radiation efficiency of the antenna structure 100.

The following embodiments will introduce different configurations and detailed structural features of the antenna structure 100. It should be understood that these illustrations and descriptions are provided merely as examples and are not intended to limit the scope of the present disclosure.

Figure 5:
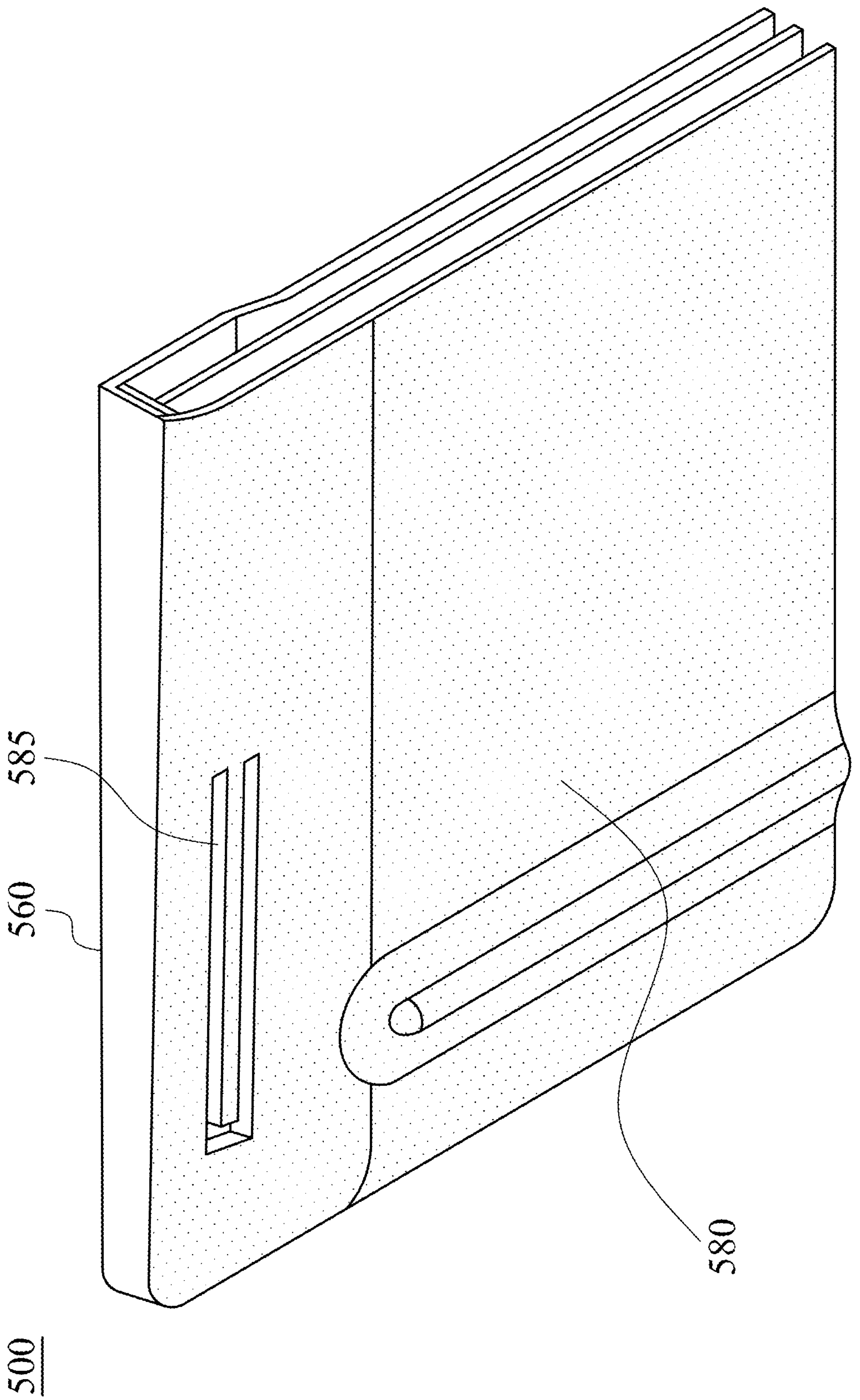
FIG. 5 is a perspective view of a notebook computer according to an embodiment of the present disclosure.

FIG. 5 shows a perspective view of a notebook computer 500 according to an embodiment of the present disclosure. In the embodiment shown in FIG. 5, the aforementioned antenna structure can be applied to the notebook computer 500 in which the notebook computer 500 at least includes a keyboard frame 560 and a base housing 580. It should be understood that the keyboard frame 560 and the base housing 580 are respectively equivalent to what is commonly referred to as the "C part" and "D part" in the notebook computer field. For example, the keyboard frame 560 may be made of a nonconductive material, while the base housing 580 may be made of a metallic material. It should be noted that the aforementioned metal mechanism element may be implemented with the base housing 580, which may have a C-shaped slot 585 to improve the radiation performance of the aforementioned antenna structure. According to actual measurement results, regardless of whether the notebook computer 500 is operating in an open mode or a closed mode, the aforementioned antenna structure can provide sufficient radiation efficiency. Since the antenna structure can be well integrated into the notebook computer 500, its overall antenna size can be further miniaturized.

Figure 6:
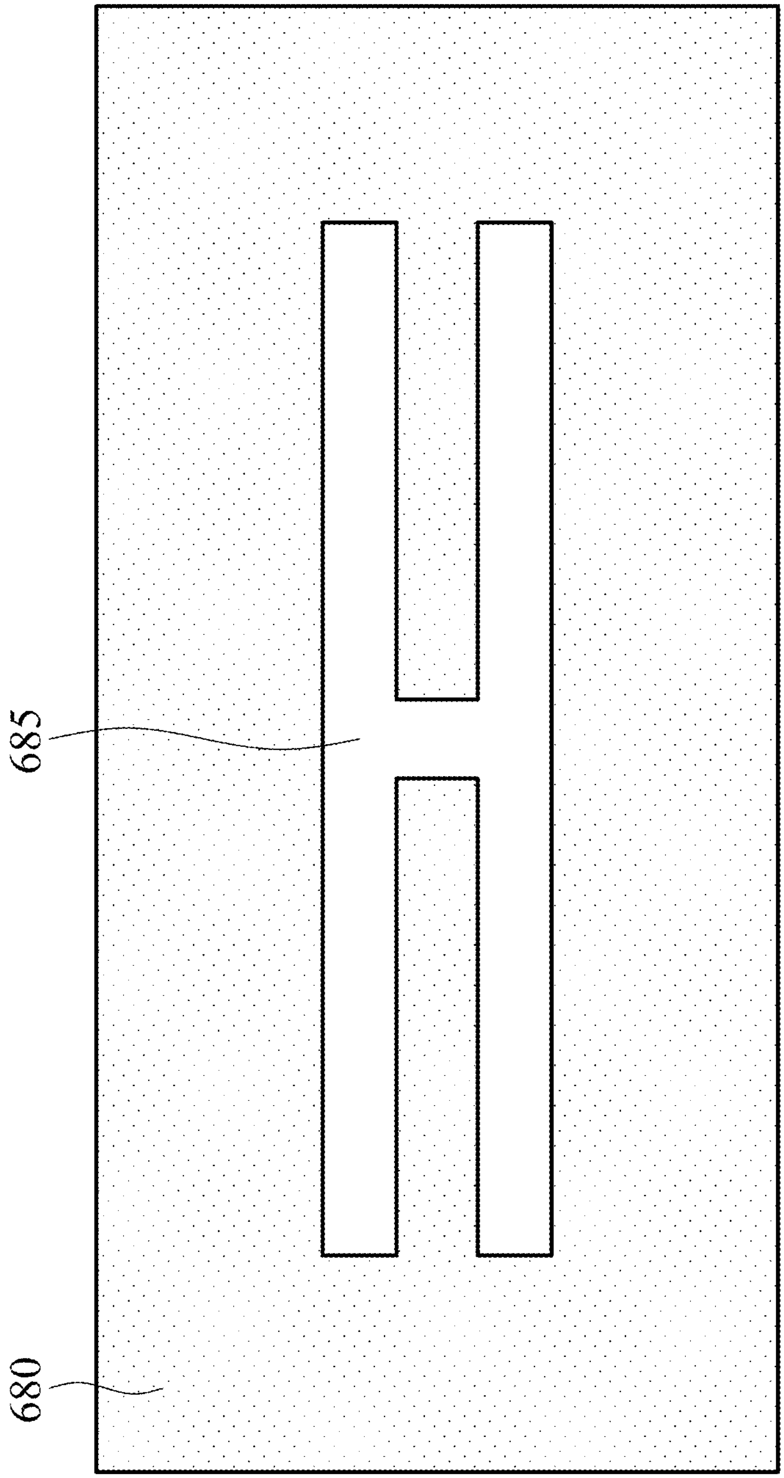
FIG. 6 is a top view of a metal mechanism element according to another embodiment of the present disclosure.

FIG. 6 shows a top view of a metal mechanism element 680 according to another embodiment of the present disclosure. In the embodiment shown in FIG. 6, the slot 685 of the metal mechanism element 680 is also a closed slot, but it may generally be H-shaped. According to actual measurement results, when the metal mechanism element 680 is applied to the antenna structure 100 shown in FIG. 1, the metal mechanism element 680 and its slot 685 also help improve the radiation performance of the antenna structure 100. In other embodiments, the slot 685 of the metal mechanism element 680 may have different shapes, such as a cross shape, an F shape, or a W shape, but is not limited thereto.

The present disclosure proposes a novel antenna structure that includes a metal mechanism element with an embedded slot. Compared with conventional designs, the present disclosure offers advantages such as small size, wide bandwidth, low manufacturing cost, and high radiation efficiency. Therefore, it is highly suitable for application in various types of mobile communication devices.

It should be noted that the component dimensions, component shapes, and frequency ranges described above are not limiting conditions of the present disclosure. Antenna designers can adjust these parameters as needed. The antenna structure of the present disclosure is not limited to the configurations illustrated in FIGS. 1-6. The present disclosure may include any one or multiple features of any one or multiple embodiments shown in FIGS. 1-6. In other words, not all features illustrated must be simultaneously implemented in the antenna structure of the present disclosure.

In this specification and the claims, ordinal numbers such as "first," "second," "third," etc., do not imply any sequential order. They are only used to distinguish between different elements with the same name.

The foregoing description of the disclosure has been presented only for the purposes of illustration and description option of the exemplary embodiments and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna structure, comprising:

a ground element;

a first radiation element having a feeding point;

a second radiation element coupled to a first grounding point on the ground element, wherein the second radiation element is adjacent to the first radiation element;

a third radiation element coupled to a second grounding point on the ground element, wherein the third radiation element is adjacent to the first radiation element, and the first radiation element is between the second radiation element and the third radiation element;

a nonconductive support element, wherein the ground element, the first radiation element, the second radiation element, and the third radiation element are disposed on the nonconductive support element; and a metal mechanism element having a slot, wherein the metal mechanism element is adjacent to the first radiation element, the second radiation element, and the third radiation element.

2. The antenna structure of claim 1, wherein the first radiation element is in an L-shape with a variable width.

3. The antenna structure of claim 1, wherein the first radiation element comprises a wide portion and a narrow portion, and the narrow portion is coupled to the feeding point through the wide portion.

4. The antenna structure of claim 1, wherein the second radiation element is in an L-shape with a uniform width.

5. The antenna structure of claim 1, wherein a first coupling gap is formed between the first radiation element and the second radiation element, and the width of the first coupling gap is between 0.1 mm and 3 mm.

6. The antenna structure of claim 1, wherein the third radiation element comprises a sloping portion and an extension portion, and the extension portion is coupled to the second grounding point through the sloping portion.

7. The antenna structure of claim 6, wherein an angle is formed between the ground element and the sloping portion of the third radiation element, and the angle is between 10 degrees and 80 degrees.

8. The antenna structure of claim 1, wherein a second coupling gap is formed between the first radiation element and the third radiation element, and the width of the second coupling gap is between 0.1 mm and 3 mm.

9. The antenna structure of claim 1, wherein the slot of the metal mechanism element is a closed slot.

10. The antenna structure of claim 1, wherein the slot of the metal mechanism element has a C-shape.

11. The antenna structure of claim 1, wherein the slot of the metal mechanism element has an H-shape.

12. The antenna structure of claim 1, wherein the first radiation element has a first vertical projection on the metal mechanism element, the second radiation element has a second vertical projection on the metal mechanism element, and both the first vertical projection and the second vertical projection at least partially overlap with the slot of the metal mechanism element.

13. The antenna structure of claim 1, wherein a predetermined distance is between the metal mechanism element and each of the first radiation element, the second radiation element, and the third radiation element, and the predetermined distance is between 1 mm and 10 mm.

14. The antenna structure of claim 1, wherein the antenna structure covers a first frequency band, a second frequency band, a third frequency band, and a fourth frequency band.

15. The antenna structure of claim 14, wherein the first frequency band is between 1400 MHz and 1500 MHz, the second frequency band is between 1800 MHz and 2690 MHz, the third frequency band is between 3300 MHz and 5000 MHz, and the fourth frequency band is between 5000 MHz and 5925 MHz.

16. The antenna structure of claim 14, wherein the length of the first radiation element is between 0.125 times and 0.25 times the wavelength of the second frequency band.

17. The antenna structure of claim 14, wherein the length of the second radiation element is between 0.125 times and 0.25 times the wavelength of the first frequency band.

18. The antenna structure of claim 14, wherein the length of the third radiation element is between 0.0625 times and 0.125 times the wavelength of the third frequency band.

19. The antenna structure of claim 14, wherein the length of the slot of the metal mechanism element is between 0.25 times and 0.75 times the wavelength of the first frequency band.

20. The antenna structure of claim 1, wherein the antenna structure is applied to a notebook computer, and the metal mechanism element is implemented with a base housing of the notebook computer.

* * * * *